T. PAYNE.
Car Brake.
No. 97,800.
2 Sheets—Sheet 2.
Patented Dec. 14, 1869.
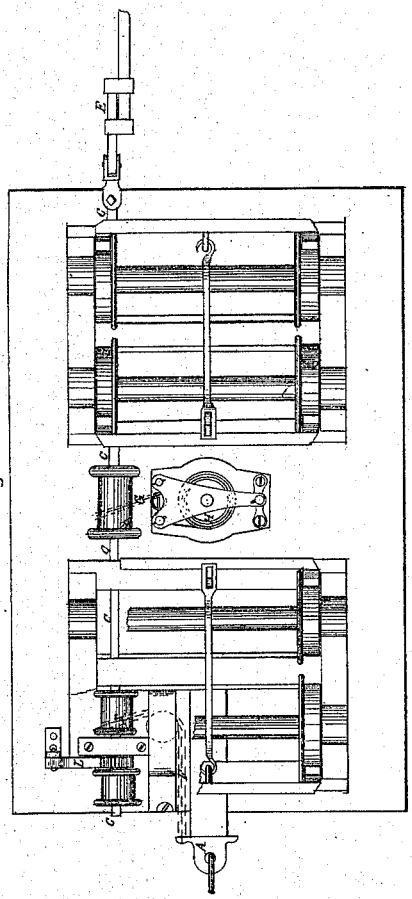
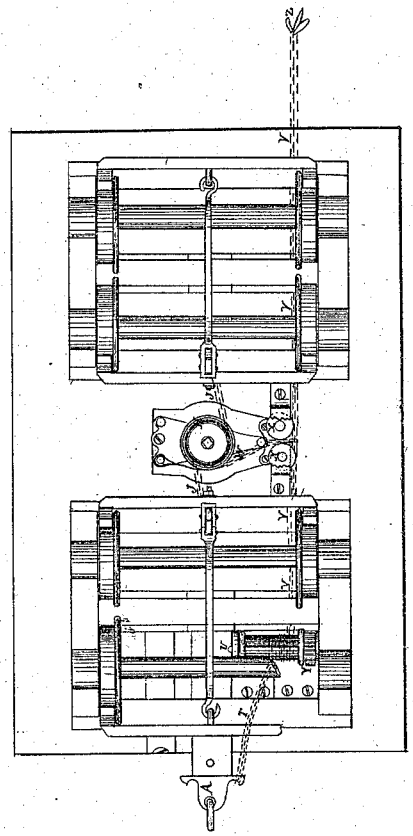
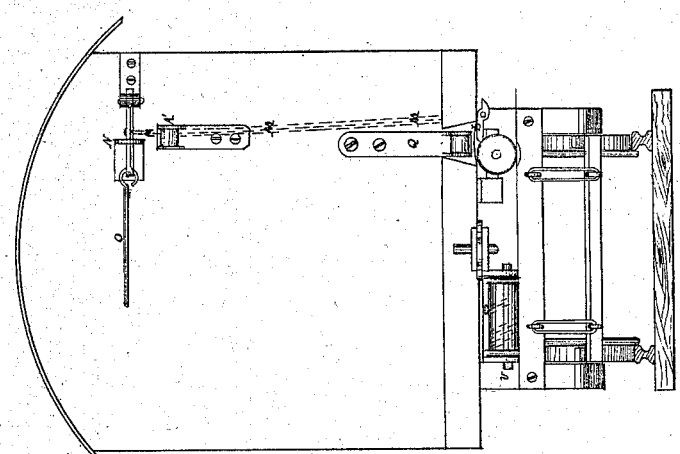

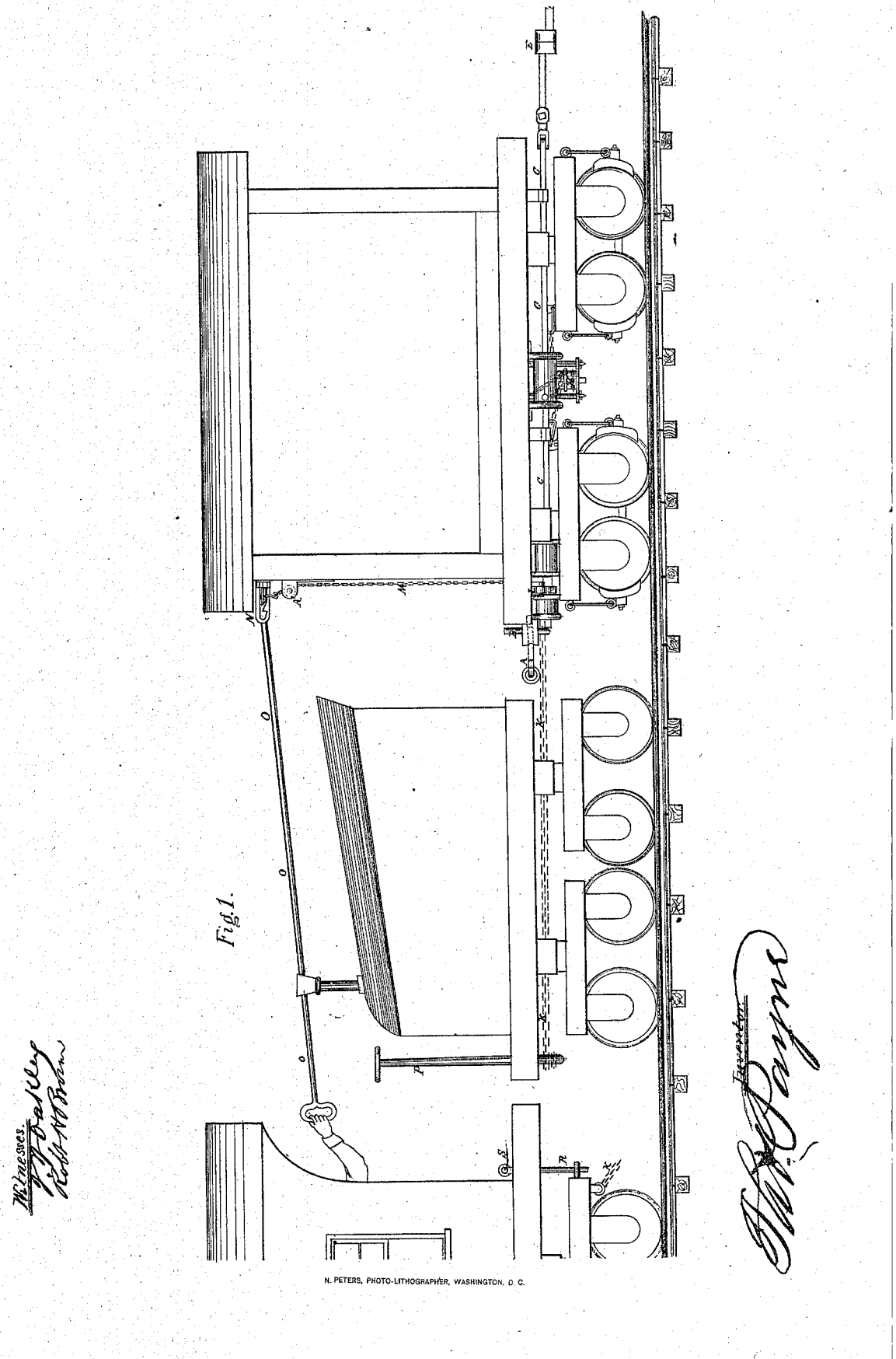

United States Patent Office.

THOMAS PAYNE, OF DETROIT, MICHIGAN.

Letters Patent No. 97,800, dated December 14, 1869.

IMPROVED RAILWAY-CAR BRAKE.

The Schedule referred to in these Letters Patent and making part of the same

*To all whom it may concern:*

Be it known that I, THOMAS PAYNE, of Detroit, Wayne county, Michigan, have invented a new and improved "Car-Brake;" and I do hereby declare that the following is a full and exact description thereof, reference being had to the accompanying drawings, and to the letters of reference marked thereon.

The nature of my invention consists in an arrangement of different devices for releasing and retaining the brakes on railway or other cars.

In order to enable others skilled in the art to make and use my invention, I will now proceed to describe its construction and operation, reference being had to the annexed drawings, which form a part of the specification, and in which—

Figure 1 is a lateral view of a car, with my brake attached.

Figure 2 is a view of the bottom of a car, with brake attached.

Figure 3 is a view of the front end of the same car.

Figure 4 is another view of the bottom of same car, with the chain marked V substituted for the rod C, as hereinafter described.

The parts lettered are as follows:

A is the draught-iron.
B is the draw-bar.
C is a tumbling-rod.
E are slides for coupling tumbling-rods between the cars.
F is the chain attached to draught-iron A and tumbling-rod C.
G is the chain from tumbling-rod to spring and spool.
H are the spring and spool.
J J are chains from spool H to brakes.
K is a chain from tumbling-rod C to tender.
L is a ratchet-wheel and pawl.
M is a chain from said pawl to the part marked A'.
N is a retainer for chain M.
O is a rod or cord from A' to "cab."
P is a brake-shaft for retaining or releasing chain K.

The parts marked with letters on fig. 4 are as follows:

T is a chain from draught-iron A to shaft U.
U is a shaft, containing spool and ratchet, as shown.
V, V, V, &c., is a chain running under the cars.
W is a chain running from chain V to spring and spool H.
X X are pulleys, to guide chain W.
Y is ratchet and pawl.
Z are links, of varied lengths, by which the chain V is coupled together from car to car.

The brake thus constructed is operated as follows:

The train being standing still, the springs released, and the brakes on, the engine or other power starts.

The pull is first on draught-iron A, which is so constructed, by reason of a slot, that the power pulls and acts upon the chain F and its connections for a period before it begins to draw upon the cars, to produce a forward motion.

Draught-iron A thus pulls on chain F, which acts on and turns tumbling-rod C, and the tumbling-rod winds up chain G, which acts on spool H and contracts spring H; this slackens the chains J J, which releases the brakes.

The brakes thus being released, are kept off by ratchet-wheel and pawl L, or the same may be done by keeping on the strain necessary to pull the train ahead; or, in other words, keeping the draught-iron A pulled out to its full extent.

The brakes are applied by shutting off and releasing the ratchet L, by pulling on rod or cord O, which releases chain F, and with it tumbling-rod C and chain G. The spring H being thus freed, instantly winds up chains J J and applies the brakes.

Should the train be stopping too quick, or the danger or necessity of stopping removed, the brakes are instantly released by using steam, and the train proceeds on its way.

The spring H may be under the centre of the car, as shown in the drawing, figs. 2 and 4, and act on two chains J J, as shown, or it may be placed under the car, near the end, and wind up but one chain, as is ordinarily done by hand.

To ease a train going down a grade, brake-shaft P, fig. 1, is turned, winding up chain K; the brakes are then applied, as before shown, but are partly kept off by chain K. The balance of power can be let on at will, by releasing chain K.

This chain K can be wound up by a friction-wheel, R, operated by contact with the driving-wheel, applied by the engineer with lever S.

Q is a spring for protecting chain K from a sudden strain, should the engineer inadvertently use steam while said chain K is wound up by the shaft P.

This arrangement of shaft P and chain K may be placed on any car, instead of the tender, and worked by a brakeman, if so desired.

In this case the engine would release the brakes, the brakeman performing the duty of applying them partly or wholly, on signal.

To "back up," the brakes can be released by the engine or by the hand-device P K.

Fig. 4 shows a modification of the same principle of my invention, which consists simply in the substitution of a chain in place of the tumbling-rod C, which may be more desirable. The operation of the whole is substantially the same.

The operation of the arrangement, as shown in fig. 4, is as follows:

The cars, being stationary, and the brakes on, the first pull, on starting, is on the draught-iron A, (see fig. 4,) which acts on chain T, turning shaft U, and winding up chain V. Said chain V acts on chain W, which turns spool H, and releases the brake-chains J J.

The brakes are applied by shutting off and pulling on rod or cord O, which releases chain V, and, with it, chain W.

The spring H is thus left free to act on the chains J J, as before described.

The chain V is under each car, and properly coupled from car to car, so that the spring and brake under each car are retained and released simultaneously.

On the return trip, the pull is on the other end of the chain V, fig. 4, and the action on chain W and spring and spool H is the same.

X X are two pulleys, which guide and keep in place the chain W.

The ratchet and pawl, marked Y in fig. 4, answers the same purpose, and is acted upon and connected with rod O and chain M, (see fig. 1,) in the same manner as is the ratchet and pawl marked L in fig. 2.

Claims.

What I claim as new in my invention, and desire to secure by Letters Patent, is—

1. The slotted draught-iron A, which slides in the draw-bar B, in combination with and acting on chain F, so that in starting the engine or power, the pull on said draught-iron A is communicated to and unwinds the chain F, thus acting on tumbling-rod C and chain G, as and for the purpose above described; or, in case the chain V be used in place of the rod C, then said draught-iron A is claimed in combination with, and acting on shaft U, as and for the purpose above described.

2. The manner of putting the brakes on by "shutting off" and drawing the rod O, thereby removing the strain of draught-iron A upon chain F, in consequence of which the spring H is released, and by its own power, unaided either by concussion or momentum, forces the brakes on.

3. The chains J J, tumbling-rod C, slides E, draw-bar B, chain F, spring and spool H, chain G, ratchet L, when arranged and acting in combination, as and for the purpose above specified.

4. The hand-power retaining and releasing-device K P Z R, for keeping the brakes partly off, and allowing the strain to apply gradually, and also for releasing brakes by hand, when desired, instead of by engine or other power, when arranged and acting in combination, as and for the purpose above set forth.

THOMAS PAYNE.

Witnesses:
ROBT. H. BROWN,
FRANCIS RAYMOND.